United States Patent [19]

Katsumata et al.

[11] 4,289,102
[45] Sep. 15, 1981

[54] ENGINE SPARK TIMING CONTROLLING DEVICE

[75] Inventors: Masaaki Katsumata; Michio Onoda; Yasuo Takagi, all of Yokohama; Kenji Yoneda, Fujisawa, all of Japan

[73] Assignee: Nissan Motor Company, Limited, Yokohama, Japan

[21] Appl. No.: 61,432

[22] Filed: Jul. 27, 1979

[30] Foreign Application Priority Data

Aug. 1, 1978 [JP] Japan .................................. 53/93967

[51] Int. Cl.³ .......................... F02D 5/04; F02P 5/04; G01L 23/22
[52] U.S. Cl. .................................... 123/425; 123/415; 123/416
[58] Field of Search .......... 123/117 D, 117 R, 148 A, 123/146 JA; 73/35

[56] References Cited

U.S. PATENT DOCUMENTS

| 3,875,912 | 4/1975 | Bullo | 123/117 R |
| 3,957,023 | 5/1976 | Peterson | 123/117 D |
| 4,012,942 | 3/1977 | Harned | 123/117 R |
| 4,061,116 | 12/1977 | Saida et al. | 123/117 D |
| 4,116,175 | 9/1978 | Sand | 123/117 R |
| 4,133,475 | 1/1979 | Harned et al. | 123/117 D |
| 4,153,020 | 5/1979 | King et al. | 123/117 R |

Primary Examiner—Charles J. Myhre
Assistant Examiner—R. A. Nelli
Attorney, Agent, or Firm—Schwartz, Jeffery, Schwaab et al.

[57] ABSTRACT

An engine spark timing controlling device using a resonant type vibration sensor having mechanical resonance characteristic near the knocking frequency of an engine. The vibration sensor is arranged on a body of an engine and the sensor output signal is processed and the spark timing is adjusted to obtain an optimum knocking condition.

5 Claims, 10 Drawing Figures

ENGINE SPARK TIMING CONTROLLING DEVICE

BACKGROUND OF THE INVENTION

1. Field of the Invention

The present invention relates to an engine spark timing controlling device for making feedback control of an engine spark timing by detecting knocking conditions of the engine.

2. Description of the Prior Art

It is known that high degree continuous engine knocking may affect for the durability of an engine. However, engine output characteristic and fuel consumption characteristic may become optimum under a suitable low degree knocking condition at comparatively low engine rotation range. The generation of knocking of an engine is closely related to spark timing of the engine. In general, the generation of knocking will increase with advance of the spark timing.

It has been known to adjust to advance or to retard the spark timing so as to match knocking condition while detecting the engine knocking condition and to maintain a light knocking condition continuously to improve the engine performance or the fuel consumption. In this case, in order to detect the knocking condition, a vibration sensor or an acceleration sensor is mounted on the body of the engine. The output signal of the sensor is at first applied to a bandpass filter and only the vibration component at the knocking frequency is sampled. Based on the output signal of the bandpass filter, the knocking condition is detected.

Such a known detecting device has disadvantages in that it is complicated systematically and also costly since vibration components other than the knocking frequency must be removed by means of a bandpass filter.

SUMMARY OF THE INVENTION

The present invention has for its object to mitigate such disadvantage. The present invention is to detect the engine knocking condition accurately by using a simple system without using a bandpass filter and to achieve a better engine spark timing control based on the detected signal.

DESCRIPTION OF THE DRAWINGS

FIGS. 6-I and 6-II are an operation time chart thereof; and

DESCRIPTION OF THE PREFERRED EMBODIMENTS

Figures 1, 2, 3A, 3B:
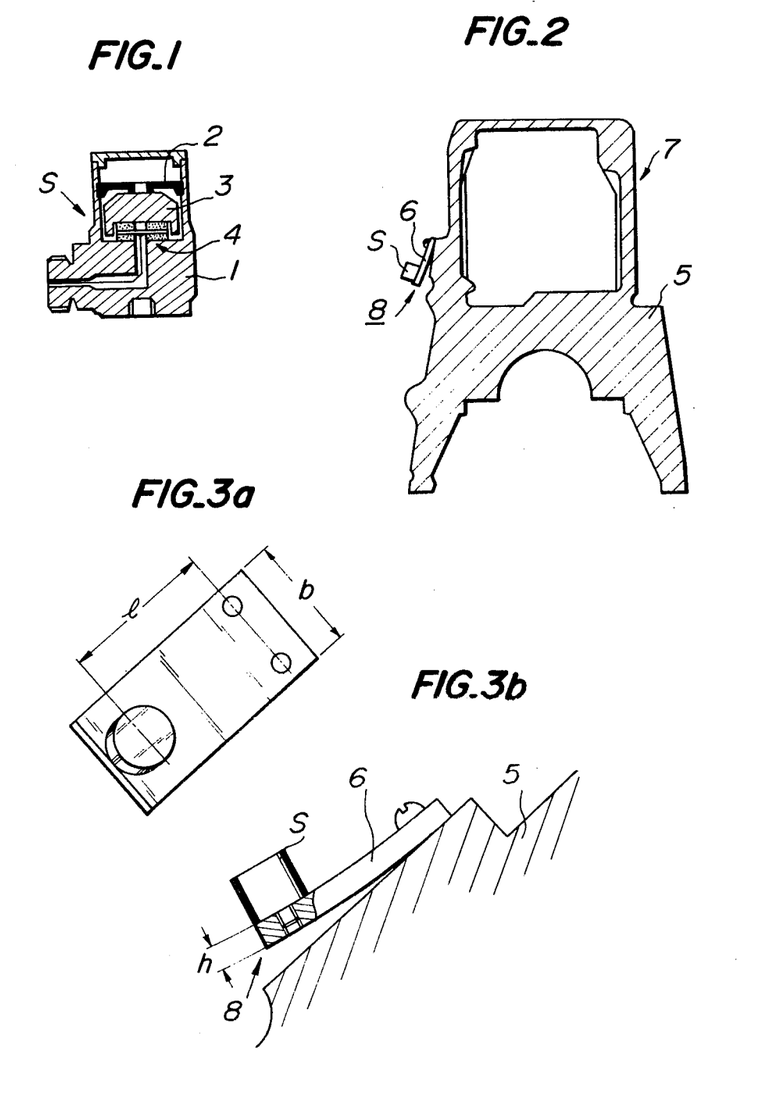
FIG. 1 is a cross-sectional view for showing a general conventional vibration sensor.
FIG. 2 is a cross-sectional view for showing a vibration sensor made in accordance with the present invention and mounted on an engine.
FIGS. 3a and 3b are plan view and side view, respectively, of the vibration sensor.

FIG. 1 shows a conventional vibration sensor generally used for this purpose. This vibration sensor comprises a vibrating member 3 having a certain predetermined mass m and elastically supported on a case body 1 by a spring 2. This vibrating member 3 forms a stationary reference point. A piezoelectric element 4 is arranged between the vibrating member 3 and the case body 1. By using the piezoelectric element 4, the vibration of a vibrating body for instance the vibration of an engine body is converted into an electric output signal.

The resonant frequency of such a vibration sensor is set very high for instance about 50 kHz and it shows a flat frequency characteristic when the engine is operating normally. Accordingly, in the conventional system, it has been required to use a bandpass filter for taking out the vibration component in the knocking frequency range.

In accordance with the present invention, in order to eliminate the use of such an electric bandpass filter, the vibration detecting portion of an engine is formed by said sensor and a resonance plate or by the sensor only, wherein the resonance frequency of the vibration detector portion is set to lie between 5.0–10.0 kHz, which is the knocking frequency range of an engine (or for an ordinary car engine, this value being 6.5–8.0 kHz). Namely by this arrangement is resonant type vibration sensor is formed.

FIGS. 2 and 3 show the vibration detecting portion 8 of the resonant type vibration sensor mounted on an engine body 7. The vibration detecting portion 8 comprises a resonant plate 6 fixed at one end to a side surface of the cylinder block 5 and a vibration sensor S of aforementioned type is mounted on a free end of the resonant plate 6.

The resonant frequency $f_0$ of the vibration detecting portion 8 is expressed by the following formula, $$f_0 = \frac{1}{2\pi} \sqrt{\frac{k}{m_1 + 0.23\, m_2}}$$

wherein;

$k = (3EI_z/l^3)$, $I_z = (1/12)bh^3$ k: spring constant of the resonance plate
$m_1$: mass of the vibration sensor
$m_2$: mass of the resonance plate
l: size between the resonance plate fixing point to the mounting portion of the vibration sensor
b: width of the resonance plate
E: youngs modulus of the resonance plate
$I_z$: secondary moment in cross-section of resonance plate Accordingly by suitably selecting the resonance plate 6 so that the resonance frequency $f_0$ becomes 5 to 10 kHz, which is the knocking frequency range of an engine, for instance $f_0 = 7$ kHz, only the vibration due to the knocking can be derived with considerable amplitude among the engine operation vibration. Due to this fact, there is no particular need to provide an electric bandpass filter as in the case of the conventional device.

Figure 4:
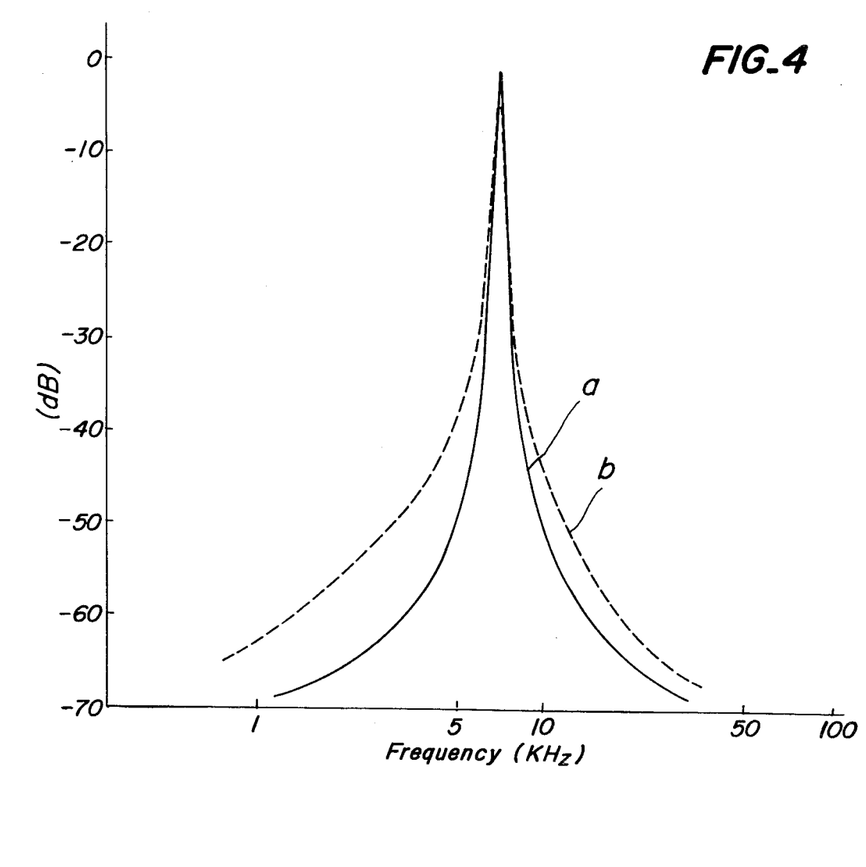
FIG. 4 is an explanatory diagram for showing detection frequency characteristics.

FIG. 4 shows a graph in comparison for a frequency characteristic indicated by line "a" of a conventional one using a bandpass filter and that indicated by line "b" of the present invention having the frequency detecting portion of which resonance frequency is 7 kHz. Both are obtained from experimental data.

The aforementioned vibration detecting portion 8 may be formed only by the vibration sensor S and the resonance frequency $f_0 = 1/2\pi\sqrt{k/m}$ (wherein k: spring constant of the spring 2, m: mass of vibrator 3) is set in a knocking frequency range and a substantially the same effect can be obtained.

Figure 5:
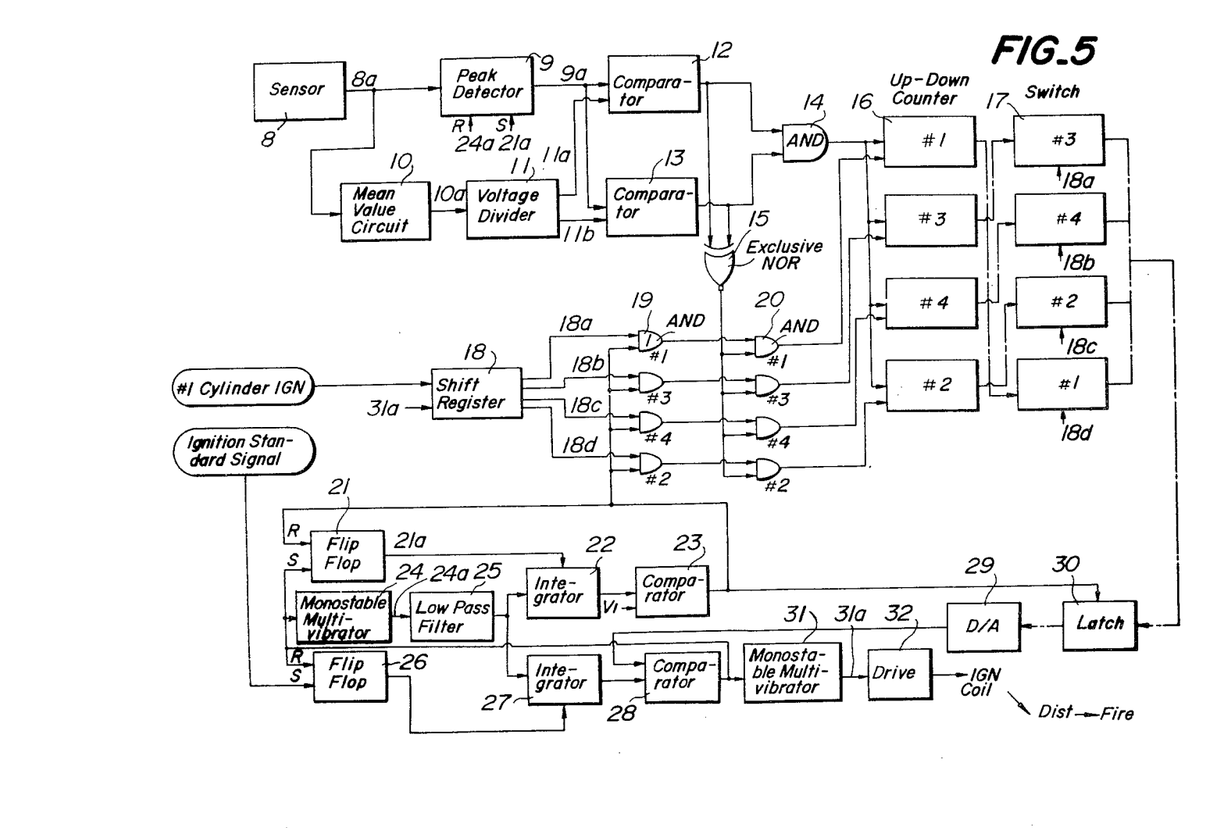
FIG. 5 is a block diagram of an embodiment of the present invention.

A signal derived from the resonant type vibration sensor or vibration detecting portion as constructed in the foregoing is processed in a circuit as shown in a block diagram in FIG. 5 so as to suitably control the spark timing.

This embodiment is to detect the knocking condition for each of the cylinders (#1 to #4) and to control the spark timing for each of the cylinders. A spark reference signal or an ignition standard signal being a standard for the spark timing is produced from a contact point or pick-up of a distributor provided with a negative pressure angle advance mechanism and a governor angle advance mechanism in order to obtain an optimum spark timing to match the engine load and the number of rotation. In general the spark timing is synchronized with said spark reference signal and the timing is lagged or retarded according to the knocking condition if knocking occurs. When a micro computer or the like is used, the spark reference signal is memorized in the memory.

The operation of the device will be explained in detail by referring to the timing diagram shown in FIG. 6 and the block diagram of FIG. 5.

The order of ignition of the cylinders is #1, #3, #4 and #2 cylinders.

Figures 1, 6:
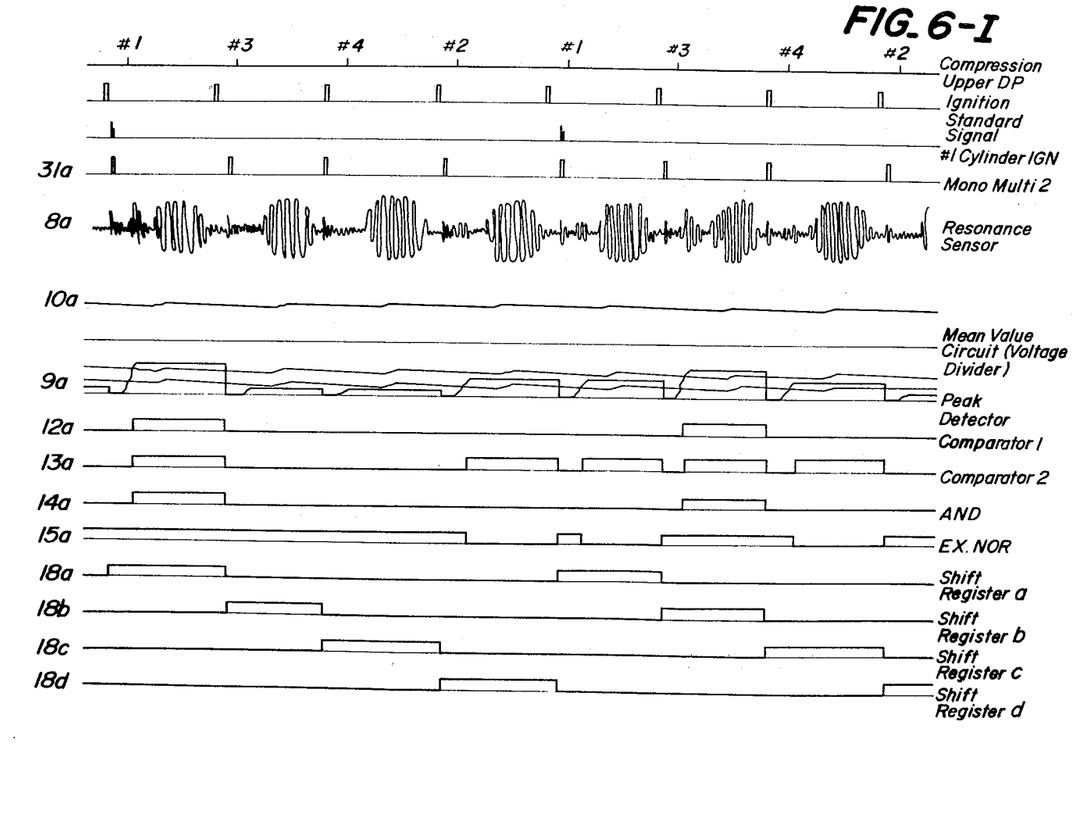
Figures 2, 6:
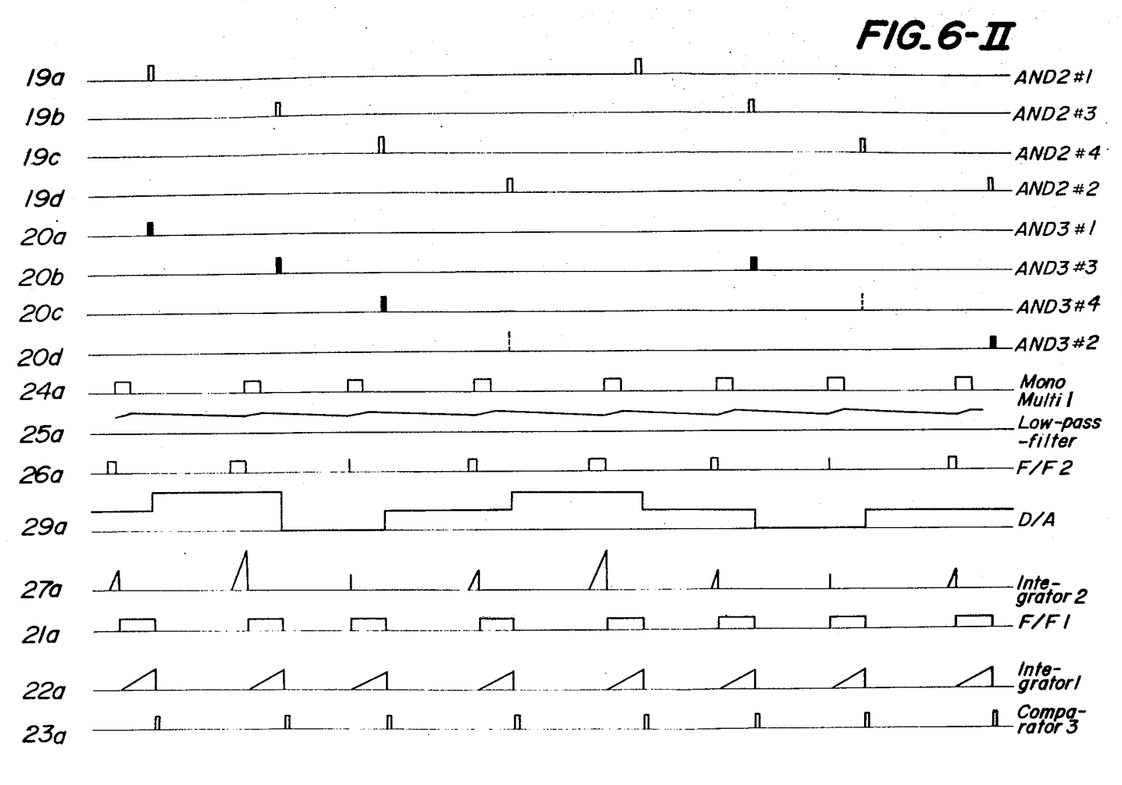

When #1 cylinder is fired, the vibration component in the knocking frequency range among the engine vibration components accompanying thereto is detected by the aforementioned resonant type vibration sensor 8 (line 8a, in FIG. 6). The detected signal is supplied to a peak detector 9 and also to a mean value circuit 10.

The peak detector 9 is reset by a mono-stable multivibrator 29 for sending a certain duration pulse output in synchronism with the spark or ignition signal (in practice an output signal of the comparator 28 through a mono-stable multivibrator 24) in order to avoid certain noises accompanied by the ignition.

The peak detector 9 samples the peak value of the detected signal of the resonant type vibration sensor 8 for a period in inverse proportion to the rotational speed by a signal from a flip-flop 21 and thereafter holds the peak value until a time of ignition of the next order cylinder i.e. #3 cylinder as shown in line 9a of FIG. 6.

This is provided under a consideration of taking samples only the peak values in the knocking vibration occurring immediately after the ignition and not to take samples for the peak values of the vibration occurring thereafter caused by vibration due to the burning action or caused from vibration of the cams or valves, etc.

On the other hand, the means value circuit 10 takes mean value or average of the signal sent from the resonant type vibration sensor 8 and supplies from its output to a voltage divider 11. The mean value circuit 10 is in practice formed of a half-wave or full-wave rectifying circuit and a low-pass filter having its time constant about 0.5 second. This circuit 10 is to obtain a signal corresponding to the background noise level of an engine as shown in line 10a of FIG. 6.

The voltage divider 11 divides this signal and to derive as its adjusted output signals two reference signals 11a (high level) and 11b (low level) being a reference for making comparison of the peak value of the knocking vibration. These two output reference signals 11a and 11b are fed to comparators 12 and 13.

The comparators 12 and 13 compare the peak value of the knocking vibration sent from the peak detector 9 with the reference signals 11a and 11b respectively. The comparators deliver output signal of high level if the peak value is higher than the two reference signals and of low level if the peak value is lower than the one or both of the two reference signals.

The respective output signals of the comparators 12 and 13 are fed to an AND circuit 14 and to an exclusive NOR circuit 15 which delivers an output signal of high level only when both the two input signals are same level.

The AND circuit 14 delivers a high level output when the peak value of the knocking vibration is higher than the high level reference signal 11a i.e. when an increase of retracting angle is required due to a fact that the knocking is too strong. The AND circuit 14 delivers a low level output when the peak value lies between the high level reference signal 11a and the low level reference signal 11b i.e. the knocking is of minor one and there is no need to adjust the amount of retracting angle to increase or to decrease and also when the peak value is lower than the low level reference signal 11b i.e. in the condition of no-knocking and it requires to decrease the amount of retracting angle.

In the present embodiment, we assume that the peak value of knocking vibration of #1 cylinder is higher than the high level reference signal 11a so that an output signal of the AND circuit 14 becomes high level. This output of the AND circuit 14 is fed to up-down counters (16-#1), (16-#3), (16-#4), (16-#2) for determining the amount of retraction of spark timing of the respective cylinders separately as their control signal.

These up-down counters are to make up-count i.e. add one (+1) to the memory content or the amount of retracting angle is increased by one (1) level from the ignition standard signal when the control signal is in high level and a timing control pulse is given to the input and to make down-count i.e. subtract by one (1) from the memory content or the amount of retracting angle is decreased by one (1) from the ignition standard signal when the control signal is low level and a timing control pulse is given to the input. In this case it should be noted that the memory content will not assume a negative value. Further if a timing control pulse is not given to the input, the same memory content is maintained irrespective to the level of the control signal.

The exclusive NOR circuit 15 assumes low level only when the knocking is minor and there is no need to increase or to decrease the amount of retracting angle with respect to the ignition standard signal, or in other words the peak value of the knocking oscillation lies between the high level reference signal 11a and the low level reference signal 11b (refer to #2 cylinder in FIG. 6). In this case the AND gates 20 are not supplied to one of its inputs with an output signal of the exclusive NOR circuit 15 and thus the timing control pulses are not sent to imputs of the up-down counters 16.

In case of #1 cylinder, as the peak value of the knocking oscillation is higher than the high level reference signal 11a, the output signal of the exclusive NOR circuit is now becomes high level so that the AND gates 20 are ready to deliver the output.

The timing control pulses are produced by a comparator 23 at a timing lagging from the ignition time by a lapse of time in counter proportion to the number of rotation.

This operation is as follows. By a signal derived from the comparator 28 in synchronism with the spark timing, a monostable multivibrator 31 is operated and its output is fed to a low-pass filter 25 to form a rotational number signal (line 25a of FIG. 6). A signal from a flip-flop 21 being set by the signal of comparator 28 in synchronism with the ignition signal and reset by a signal of the comparator 23 is used to set an integrator 20 so as to integrate the rotational number signal.

The comparator 23 operates at a time when the output signal of the integrator 22 becomes higher than a certain reference signal, i.e. at a time lapse in counter proportion to the number of rotation from the ignition and sends out the timing control pulses. (line 23a of FIG. 6) At the same time, the flip-flop is reset and the integrator 22 is also reset. The output signal of the flip-flop 21 is used as the sampling signal as described in the foregoing.

The timing control pulse sent from the comparator 23 at a time lapsing a certain period which is counter proportion to the number of rotation from the time of ignition must identify the ignited cylinder correctly (in this case #1 cylinder) and to supply the output signal only to the up-down counter 16 for said ignited cylinder.

For this object 4-bit shift register (ring counter) 18 and AND gates 19 are provided.

The shift register 18 receives its input an ignition signal of #1 cylinder obtained from a sensor mounted on a high tension cord of the #1 cylinder and an output signal of a monostable multivibrator 31, which constitutes the ignition control pulses for the respective cylinder. The shift register 18 delivers a high level output only for #1 bit when it receives ignition signal of the #1 cylinder as shown at line 18a of FIG. 6. Thereafter the shift register 18 delivers high level outputs at #3, #4, and #2 cylinders sucessively at the time of receipt at the input of respective control pulses from the monostable multivibrator 31 for the #3, #4, and #2 cylinders. (refer to line 18b, 18c, 18d, in FIG. 6)

This ignition signal of the #1 cylinder is used for defining which of the cylinders had been fired. However, as the ignition is effected in cyclical order for each of the cylinders said #1 cylinder signal may be dispensed with depending on the situation.

The output signals 18a, 18b, 18c, 18d of each bit of the shift register 18 are sent to respective inputs of AND gates (19-#1), (19-#3), (19-#4), (19-#2). In parallel thereto the output signals 18a, 18b, 18c, 18d are supplied to switches (17-#3), (17-#4), (17-#2), (17-#1) respectively as the control signal.

In the present instant, it is assumed that only the ignition of #1 cylinder is effected so that only the first bit of the shift register 18 is high level and only the AND gate (19-#1) is open to pass an input signal.

As mentioned above the knocking of the #1 cylinder is very strong one so that the exclusive NOR circuit 15 has high level output and all the AND gates 20 are opened condition.

Accordingly, the timing control pulse sent from the comparator 23 passes through the AND gate (19-#1) and the AND gate (20-#1) and is sent to an input of the up-down counter (16-#1). (refer to 19-#1a and 20-#1a, in FIG. 6) In this case the control signal sent from the AND circuit 14 is high level as mentioned in the foregoing so that the up-down counter (16-#1) counts up one level. The previous memory content of the up-down counter (16-#1) was "delay angle level 1." This corresponds to an amount of unit delay angle from the ignition standard signal. If the up-down counter is 4-bit, this signal is a digital signal of "0001." Accordingly, by this process, the memory content becomes "delay angle level 2" ("0010").

By this arrangement, the next ignition of the #1 cylinder is effected at a time of retracting twice delay angle of the unit delay angle from the ignition standard signal.

On the other hand in parallel thereto and during a time in which the output signal 18a of the shift register 18 assumes high level, the switch (17-#3) is closed in order to determine the ignition timing of the next firing order cylinder succeeding to the #1 cylinder, which is #3 cylinder in this case. The switch (17-#3) is formed of switches having number of bits corresponding to the up-down counters. In this case, the memory content of up-down counter (17-#3) which is a signal of "delay angle level 2" is delivered as the output to a latch circuit 30.

The latch circuit 30 latches this digital signal at a time of input of the aforementioned timing control pulse and sends out as its output to a digital-to-analog converter 29.

The output of the digital-to-analog converter 29 becomes a reference signal of comparison of the comparator 28. (29a of FIG. 6)

The comparator 28 at the same time receives at its input an output signal of an integrator 27 which integrates the number of rotation signal during a period in which the flip-flop 26 is high level.

The flip-flop 26 is set by the ignition standard signal sent from the distributor and is reset by an output signal sent from the comparator 28.

Accordingly, the integrator 27 commences integration of the rotational number signal at a time when the ignition standard signal is given to its input. The integration is discontinued when the integrated output signal exceeds the comparison signal derived from the digital-to-analog converter 29, which in this case an analog voltage corresponding to 2 times of the unit delay angle. This means that the integration is discontinued at a time of step down of the output signal of the comparator 28. In this case the rotational number signal is integrated under a purpose of conversion of angle to time.

The monostable multivibrator 31 is triggered at the step up of the output signal of the comparator and delivers an ignition control pulse to a driving circuit 32. The driving circuit 32 intermittently energizes the ignition coil to produce a high voltage and supplies to the spark plug of #3 cylinder through a distributor.

By this, a condition of the ignition of the #3 cylinder is memorized in the up-down counter (16-#3) and the ignition is effected at a time retracted by twice of unit delay angle from the ignition standard signal during which the engine rotation proceeds twice of the unit delay angle. The ignition control pulse 31a sent from the monostable multivibrator 31 is also supplied to the shift register 18 as mentioned above and the shift register 18 assumes high level only for the second bit.

In the same process as mentioned with respect to the #1 cylinder, the next "delay angle" of #3 cylinder is determined and held and at the same time the ignition timing #4 cylinder is decided.

The four cylinders in the firing order are successively judged for the knocking level and processed and memorized. Namely, the four firings or ignitions are regarded as one cycle and the amount of increase or decrease from the ignition standard signal is effected base on the immediately preceding result of process memorized in the up-down counters (16-#1), (16-#3), (16-#4), (16-#2) of the cylinders, i.e. based on "delay angle level signal."

In the present embodiment as illustrated in FIG. 6, as the #3 cylinder is in condition of no knocking one down count is effected to fire at "delay angle level 1." Likewisely, the #4 cylinder, which was fired at "delay angle 0" (or ignited by ignition standard signal), is in the condition of no knocking, but it will be further fired at "delay angle 0." (This means that even down count signal is given the value will not assume below 0.) The #2 cylinder, which was fired at "delay angle level 1" is at light knocking condition so that it will be fired without change and same at "delay angle level 1." (As mentioned above, the AND gate 20 is closed by the exclusive NOR circuit 15 and the timing control pulse is cut.) The level of the delay angle is adjusted for each of the cylinders as mentioned above.

The succeeding firing is effected based on thus adjusted "delay angle level." Since the #1 cylinder is light knocking condition the succeeding firing is unchanged from the "delay angle level 1" and as the #3 cylinder is at high knocking level it is given the up count to fire at "delay angle level 2." The #4 cylinder is in light knocking level so that it will be fired without changing the condition and at "delay angle level 0," and the #2 cylinder is in condition of no knocking so that it is given down count to fire "delay angle level 0."

According to the present invention, the knocking levels in each of the cylinders #1-#4 are judged individually for each ignition and based on said judgement the ignition timing is suitably set for each of the cylinders so that even there is fluctuation of the knocking condition for the cylinder, an optimum fuel consumption and output power characteristics can be obtained.

Figure 7:
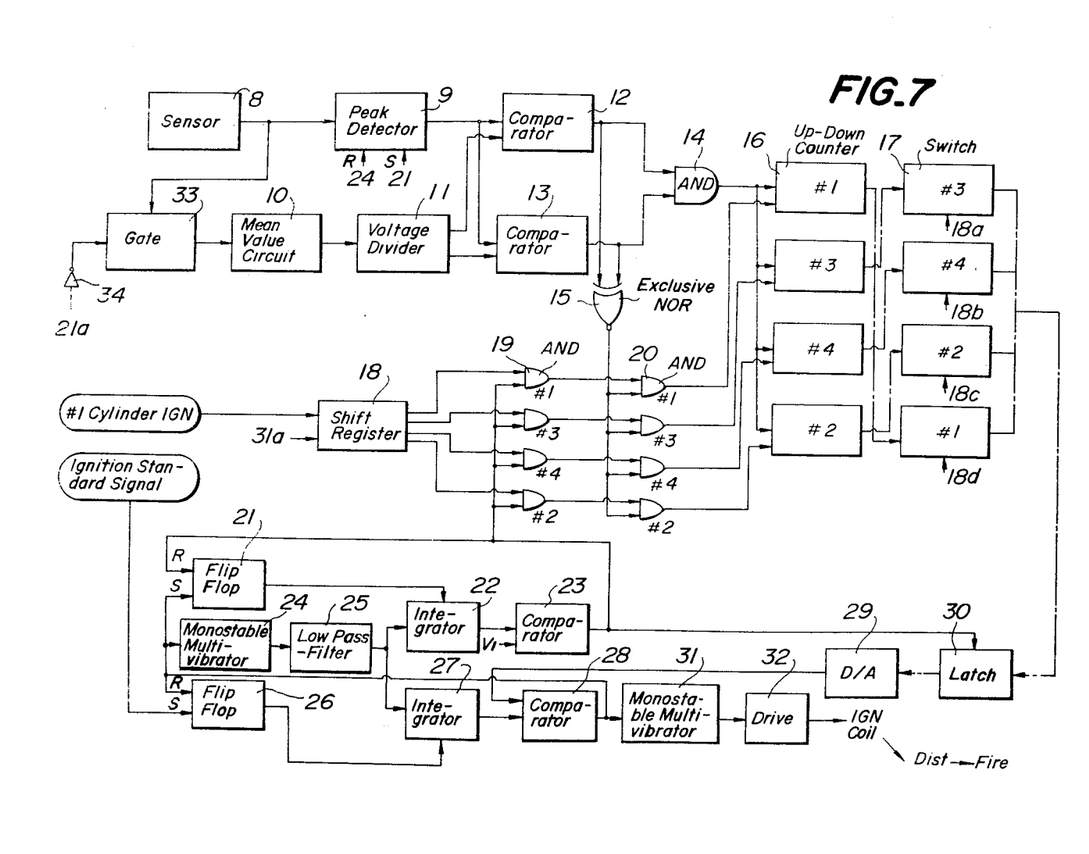
FIGS. 7 and 8 are block diagrams for showing other embodiments of the present invention.

An ignition timing control equipment as shown in FIG. 7 is to insert a gate circuit 33 between the resonant type vibration sensor 8 and the mean value circuit 10 in order to prevent input of the knocking component to the mean value circuit 10. The output signal 21a of the flip-flop 21 is inverted by an inverter 34 and by using this inverted signal, the gate circuit 33 is opened. By this arrangement, the output signal of the mean value circuit 10 may become more closer to the background noise.

Figure 8:
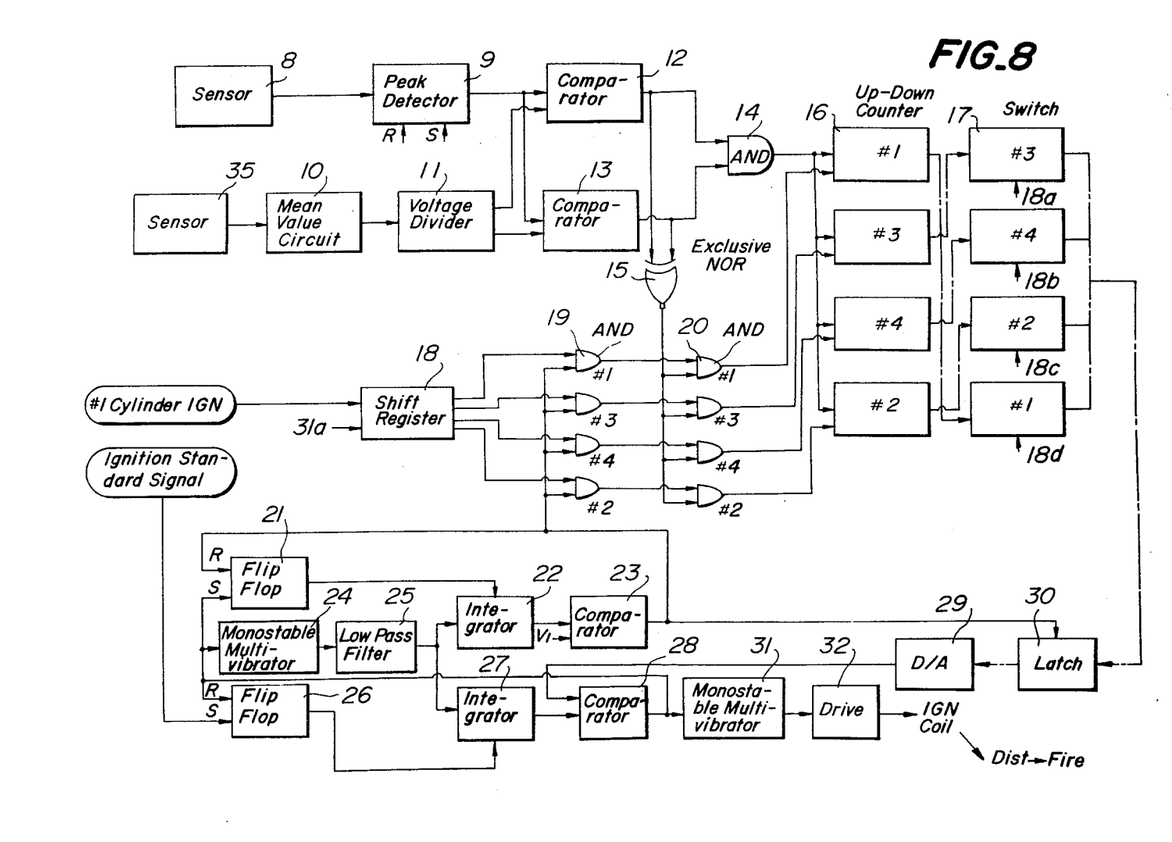

As the other portion of the circuit in FIG. 7 is same as FIG. 5, the detailed explanation is omitted. FIG. 8 is a further alternative, in which an ordinary vibration sensor 35 having a high resonance frequency is additionally provided and the output is applied to the mean value circuit 10. This embodiment will give substantially the same result with that of FIG. 7.

In all these embodiments shown in FIGS. 5, 7 and 8 the low frequency components in the output signal of the resonant type vibration sensor 8 may be cut by means of a condenser so as to further improve the control accuracy.

As has been explained in the foregoing according to the present invention, the knocking is detected by using a simple system using a resonant type vibration sensor and the knocking condition is identified based on the detected signal and the amount of delay of the ignition timing from the ignition standard signal is adjusted to increase or to decrease so that an optimum ignition timing control can be obtained and the fuel consumption and output characteristics can be much improved.

The invention is not restricted for the illustrated embodiments only and it may be realized in various manner without departing the scope of the invention.

What is claimed is:

1. An engine ignition timing controlling device for an engine having a plurality of cylinders comprising a resonant type vibration sensor for detecting the knocking level of an engine and having a resonant frequency which is within the knocking frequency range of said engine, a means for detecting the mean vibrational level of the engine, means for sampling a peak value of an output signal of the sensor for a period of time which is inversely proportional to the engine speed and holding the sampled peak value until an ignition time for the next cylinder is reached, a means for comparing the mean vibrational level detected by said detecting means with said peak value sampled by said sampling and holding means, a means for generating an ignition standard signal corresponding to a driving condition of the engine, a means for determining a retardation angle of ignition timing with respect to the ignition standard signal in accordance with an output signal of the comparing means, a means for generating an ignition timing signal based on the output signal of the determining means, wherein retardation angle of ignition timing with respect to said ignition standard signal is controlled when knocking occurs to optimize the knocking of the engine.

2. An engine ignition timing controlling device as claimed in claim 1, wherein the detecting means comprises a mean value circuit for generating, as said mean vibrational level, the mean value of the output signal of the resonant type vibration sensor.

3. An engine ignition timing controlling device as claimed in claim 1, wherein the detecting means comprises a gate circuit which allows to pass the output signal of the resonant type vibration sensor only for a certain period, and a mean value circuit means for generating, as said mean vibrational level, the mean value of an output signal of said gate circuit.

4. An engine ignition timing controlling device as claimed in claim 1, wherein the detecting means comprises a mean value circuit for generating, as said mean vibrational level, the mean value of an output signal of a separate engine vibration sensor.

5. An engine ignition timing controlling device as claimed in claim 1, wherein the knocking level of each cylinder is detected said device further including means for controlling the ignition timing for each of said cylinders.

* * * * *